(12) United States Patent
Trim et al.

(10) Patent No.: US 11,816,551 B2
(45) Date of Patent: Nov. 14, 2023

(54) OUTCOME-BASED SKILL QUALIFICATION IN COGNITIVE INTERFACES FOR TEXT-BASED AND MEDIA-BASED INTERACTION

(71) Applicant: International Business Machines Corporation, Armonk, NY (US)

(72) Inventors: Craig M Trim, Ventura, CA (US); Rashida Hodge, Ossining, NY (US); Gandhi Sivakumar, Victoria (AU); Victor Povar, Vancouver (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1206 days.

(21) Appl. No.: 16/180,916

(22) Filed: Nov. 5, 2018

(65) Prior Publication Data

US 2020/0143223 A1    May 7, 2020

(51) Int. Cl.

| | |
|---|---|
| *G06N 3/00* | (2023.01) |
| *G06N 3/006* | (2023.01) |
| *G10L 15/18* | (2013.01) |
| *H04L 51/02* | (2022.01) |
| *G06N 20/00* | (2019.01) |
| *G06F 40/30* | (2020.01) |
| *G06V 40/16* | (2022.01) |

(52) U.S. Cl.
CPC ............ *G06N 3/006* (2013.01); *G06F 40/30* (2020.01); *G06N 20/00* (2019.01); *G06V 40/174* (2022.01); *G10L 15/1807* (2013.01); *H04L 51/02* (2013.01)

(58) Field of Classification Search
CPC .... G06F 17/30047; G06F 3/048; G06F 40/30; G06N 3/006; G06N 20/00; G06V 40/174; G10L 15/1807; H04L 51/02
See application file for complete search history.

(56) References Cited

U.S. PATENT DOCUMENTS

| | | | |
|---|---|---|---|
| 7,853,357 B2 | 12/2010 | Sawada et al. | |
| 9,711,056 B1 | 7/2017 | Nguyen | |
| 9,722,957 B2 | 8/2017 | Dymetman et al. | |
| 10,817,316 B1 * | 10/2020 | Young | ............... G06F 16/24575 |

(Continued)

FOREIGN PATENT DOCUMENTS

| | | |
|---|---|---|
| CN | 104350541 A | 4/2013 |
| CN | 104809503 A | 4/2015 |

(Continued)

*Primary Examiner* — Sherrod L Keaton
(74) *Attorney, Agent, or Firm* — Garg Law Firm, PLLC; Rakesh Garg; Robert Richard Aragona (57) ABSTRACT

One or more communication capabilities and a plurality of versions of communication terms of a cognitive interface are identified. A probability of a particular user reaction for each communication term version is determined. A desired outcome of an interaction between a user and the cognitive interface is determined. A first communication term version is selected from the plurality of communication term versions based on the determined probabilities of the communication term versions and the desired outcome. An interaction between the user and the cognitive interface is created using the selected first communication term version. The interaction is sent to a communication device associated with the user.

19 Claims, 5 Drawing Sheets

(56) References Cited

U.S. PATENT DOCUMENTS

| | | | |
|---|---|---|---|
| 2008/0096533 A1* | 4/2008 | Manfredi | G06N 3/006 |
| | | | 455/412.1 |
| 2014/0067729 A1* | 3/2014 | Kozloski | G06N 7/01 |
| | | | 706/12 |
| 2015/0186155 A1* | 7/2015 | Brown | G06F 3/04817 |
| | | | 715/706 |
| 2017/0180276 A1 | 6/2017 | Gershony et al. | |

FOREIGN PATENT DOCUMENTS

| | | |
|---|---|---|
| CN | 205588307 U | 4/2016 |
| WO | 2008136737 A1 | 5/2007 |

* cited by examiner

OUTCOME-BASED SKILL QUALIFICATION IN COGNITIVE INTERFACES FOR TEXT-BASED AND MEDIA-BASED INTERACTION

TECHNICAL FIELD

The present invention relates generally to a method, system, and computer program product for cognitive interface interaction. More particularly, the present invention relates to a method, system, and computer program product for outcome-based skill qualification in cognitive interfaces for text-based and media-based interaction.

BACKGROUND

Cognitive models are computer models that deal with simulating human problem-solving and mental processing such as to solve problems, predict behavior, or improve human-computer interaction. Such models are sometimes terms as "cognitive entities (CEs) or cognitive interfaces (CIs). Cognitive interfaces aimed to remember past user interactions, interact with a user in a current interaction, and continuously learn and refine responses for future interactions with users. Various types of cognitive interfaces exist such as virtual avatars, embodied interfaces (e.g., smarter rooms), and tangible interfaces. An interaction channel between the cognitive interface and a user varies depending upon the type of cognitive interface. For example, a kinematic capable tangible cognitive entity, such as a robot, may be able to interact with end users using one or more of physical, verbal, and gesture interactions with end users. Avatar-based cognitive entities may be able to interact with end users verbally and/or by gestures. A cognitive room may be able to interact through audio interfaces. In cognitive interfaces, interaction with users in the external world can be enabled through modules called skill modules. Skill modules are enabled to implement various "skills" of the cognitive interface that represent the communication/interaction capabilities of a cognitive interfaces such as text capabilities or other capabilities used to interact with a user.

SUMMARY

The illustrative embodiments provide a method, system, and computer program product. An embodiment of a computer-implemented method includes identifying one or more communication capabilities and a plurality of versions of communication terms of a cognitive interface, and determining a probability of a particular user reaction for each communication term version. The embodiment further includes determining a desired outcome of an interaction between a user and the cognitive interface, and selecting a first communication term version from the plurality of communication term versions based on the determined probabilities of the communication term versions and the desired outcome. The embodiment further includes creating an interaction between the user and the cognitive interface using the selected first communication term version, and sending the interaction to a communication device associated with the user.

Another embodiment further includes receiving feedback of a reaction of the user to the interaction, and modifying the probability of the first communication term version based on the received feedback.

In another embodiment, the feedback includes include at least one of audio or video feedback indicative of a reaction of the user to the interaction. In another embodiment, the feedback includes at least one of a facial reaction, a gesture, or a voice inflection of the user. In another embodiment, the feedback includes an emotion change of the user in response to the interaction.

Another embodiment further includes receiving feedback of a reaction of the user to the interaction, and changing an outcome associated with the first communication term version based on the received feedback.

In another embodiment, the communication term versions include text skills of the cognitive interface. In another embodiment, the text skills include one or more of text acronyms, similes, text terms, symbols, or images.

In another embodiment, the desired outcome includes changing an emotional level of the user. In another embodiment, the communication terms include at least one of audio media or video media.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed outcome-based skill qualification in cognitive interfaces for text-based and media-based interaction. One or more embodiments recognize that current skill modules are typically static and lack the ability to effectively simulate human-like interactions to produce a desired effect. For example, humans often act with particular outcomes in mind during interactions. The illustrative embodiments used to describe the invention generally address and solve the above-described problems and other problems related to outcome-based skill qualification in cognitive interfaces. In one or more embodiments, a text-based cognitive interface application is provided to dynamically selects versions or flavors of one or more text skills to produce an intended outcome during interaction with a user.

In various embodiments, an interactions between a cognitive interface and the external world, such as with a user, can be termed as utilizing an "expertise" or a "skill". In one or more embodiments, the cognitive interface maintains several versions of the expertise or skill based on an impact or outcome of the expertise or skill upon an interaction. In an example use case, the cognitive interface attempts to produce a happy response from a human user in a chat based interface by, for example, sending a multimedia messaging server (MMS) image, sending a "smiley" or other emoticon, or saying "Hiiiiiii" to produce the intended outcome. One or more embodiments provide for version driven outcome-based skills and refinement through continuous feedback from user reactions. In one or more embodiments, one or more versions may include combined capabilities and outcomes for text and media such as using terms such as "Hiii" and also delivering an MMS message for achieving the desired outcomes.

An embodiment provides for an outcome-based skill manager application for text interfaces configured to automatically identify cognitive interfaces and associated scopes (e.g. compatible user interfaces and/or compatible text skills) and perform atomic or aggregated interaction functions with a user to achieve a desired outcome. In an embodiment, the application re-initializes and identifies compatible txt skills for every addition, modification, or removal of a cognitive text interface.

An embodiment provides for an outcome-based skill selector application for text interfaces of a cognitive interface which is configured to identify a number of versions of text capabilities and representations (e.g., text skills) with each version specifying an outcome during an interaction. In particular embodiments, the text versions are associated with text acronyms, specific similes, specific terms such as "Hiii" or "Hai", written symbols, in-line images, MMS images, and/or other text features. In particular embodiments, such text versions can include individual and/or a collection of text features in singular or aggregate. In another particular embodiments, the text representations may include other associated media such as audio and/or video media represented in parallel or sequentially with the text representations during an interaction for achieving one or more desired outcomes. In the embodiment, each text version defines an outcome with an associated probability threshold such as a probability of pleasing an interacting user, upsetting an interacting user, or triggering happiness for an interacting user. In particular embodiments, text skill capabilities are related to individuals, groups, or location based upon a location of the user.

In one or more embodiments, an application selects a text version for presenting to a user during an interaction based upon a probability of the text version producing one or more desired outcomes such as pleasing an interacting user, upsetting an interaction users, or triggering happiness in an interaction with the user. In particular embodiments, if one or more text versions have the same probability of producing a particular outcome, the application uses a random or a definite algorithms to select the text version to use during the interaction.

In the embodiment, the application executes the selected text version to send the selected text version to the user during the interaction. In one or more embodiments, the text capabilities of the selected text version are played in sequence within one or more available external text interfaces complying with device capabilities of a device associated with a user.

In one or more embodiments, the application captures feedback of reactions or outcomes associated with the selected text version from the end users and refines the probability of the outcome based upon the feedback. In particular embodiments, the feedback may include audio or video feedback indicative of a reaction of the user to the text version such as, for example, facial reactions, gestures, or voice inflection. In particular embodiments, the feedback may include input from an emotion analytics component to provide an analysis of the emotion of the user in response to the text version. For example, if the text output was intended to increase happiness in the user but instead produced an upsetting reaction in the user, the application aligns the probability score of the expected initial outcome. In another particular embodiment, the feedback is received from a wearable device of the user.

An embodiment can be implemented as a software application. The application implementing an embodiment can be configured as a modification of an existing cognitive interface system or platform, as a separate application that operates in conjunction with an existing cognitive interface system or platform, a standalone application, or some combination thereof.

The illustrative embodiments are described with respect to certain types of cognitive interface tools and platforms, text version determining procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
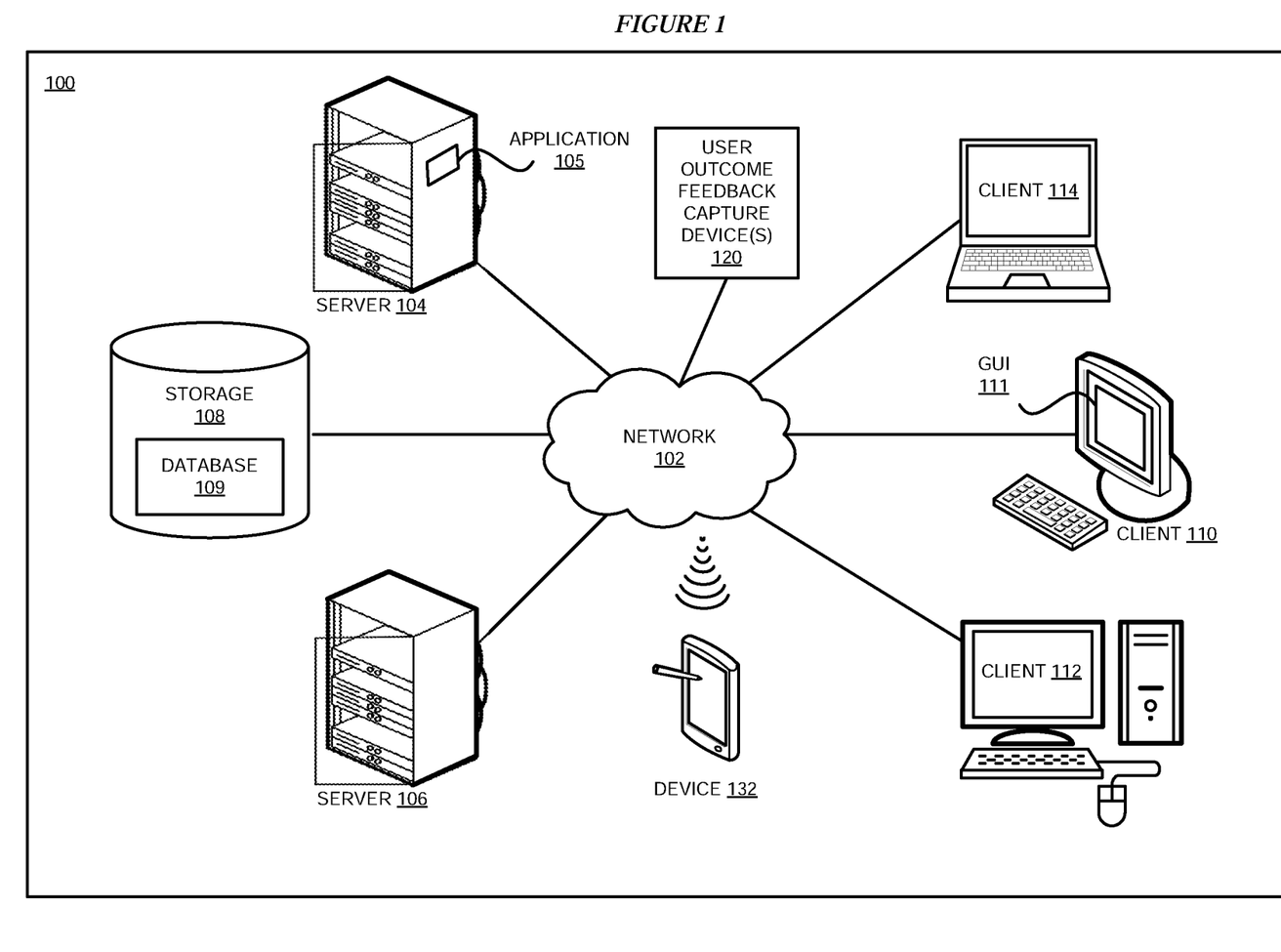
FIG. 1 depicts a block diagram of a network of data processing systems in which illustrative embodiments may be implemented.
Figure 2:
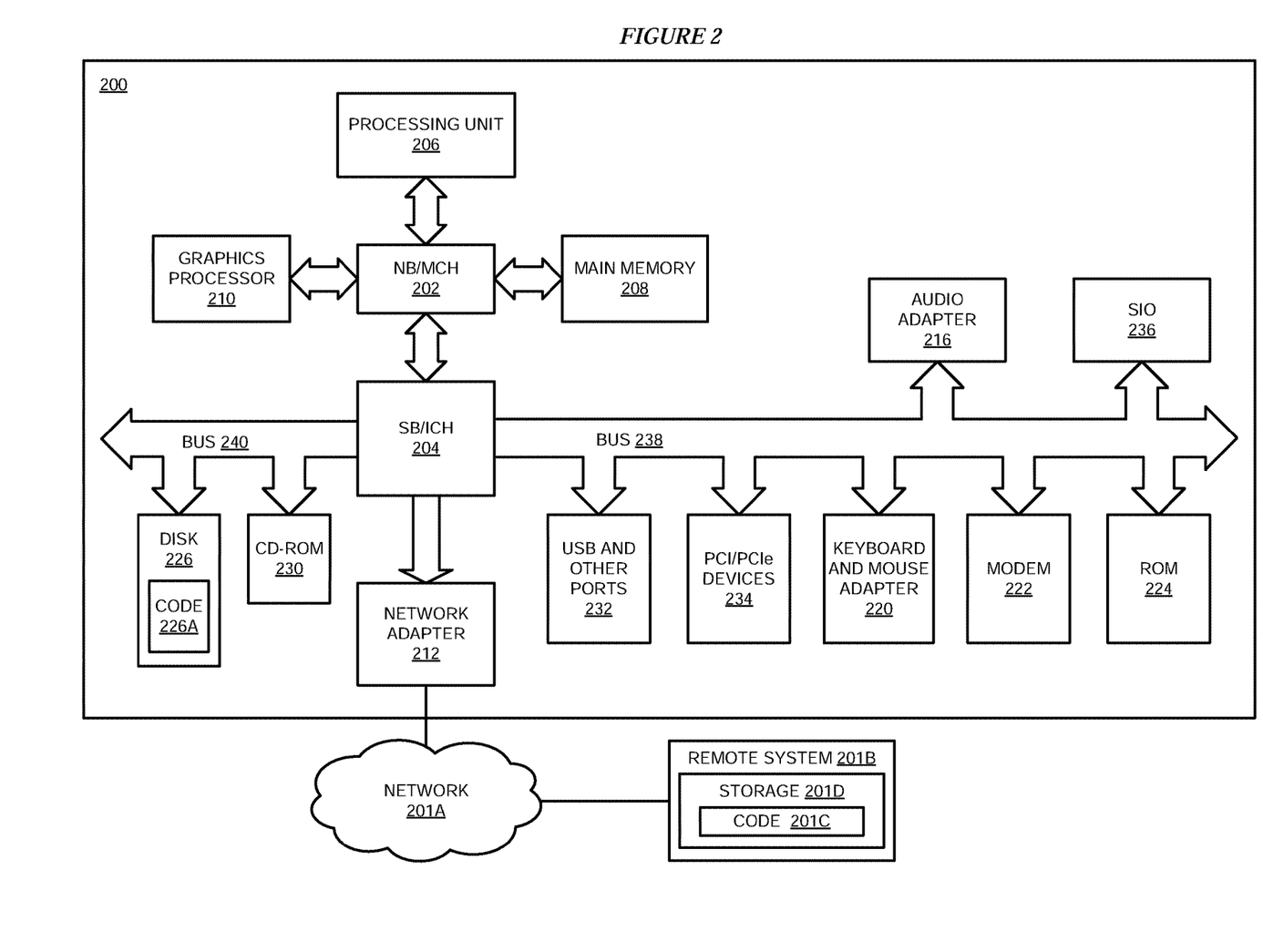
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for outcome-based skill qualification in cognitive interfaces for text-based and media-based interaction in accordance with one or more embodiments.

Storage device 108 includes one or more databases 109 configured to store skills and associated outcomes as described herein. Claim 110 includes a graphical user interface (GUI) 111 or other user interface configured to allow a user to interactive with a cognitive interface as described herein. One or more user outcome feedback capture devices 120 are configured to capture a reaction of a user to a particular text version during an interaction and provide the feedback to application 105 as further described herein. In particular embodiments, user outcome feedback capture devices 120 include one or more of an audio capture device or a video capture device within an environment of the user.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
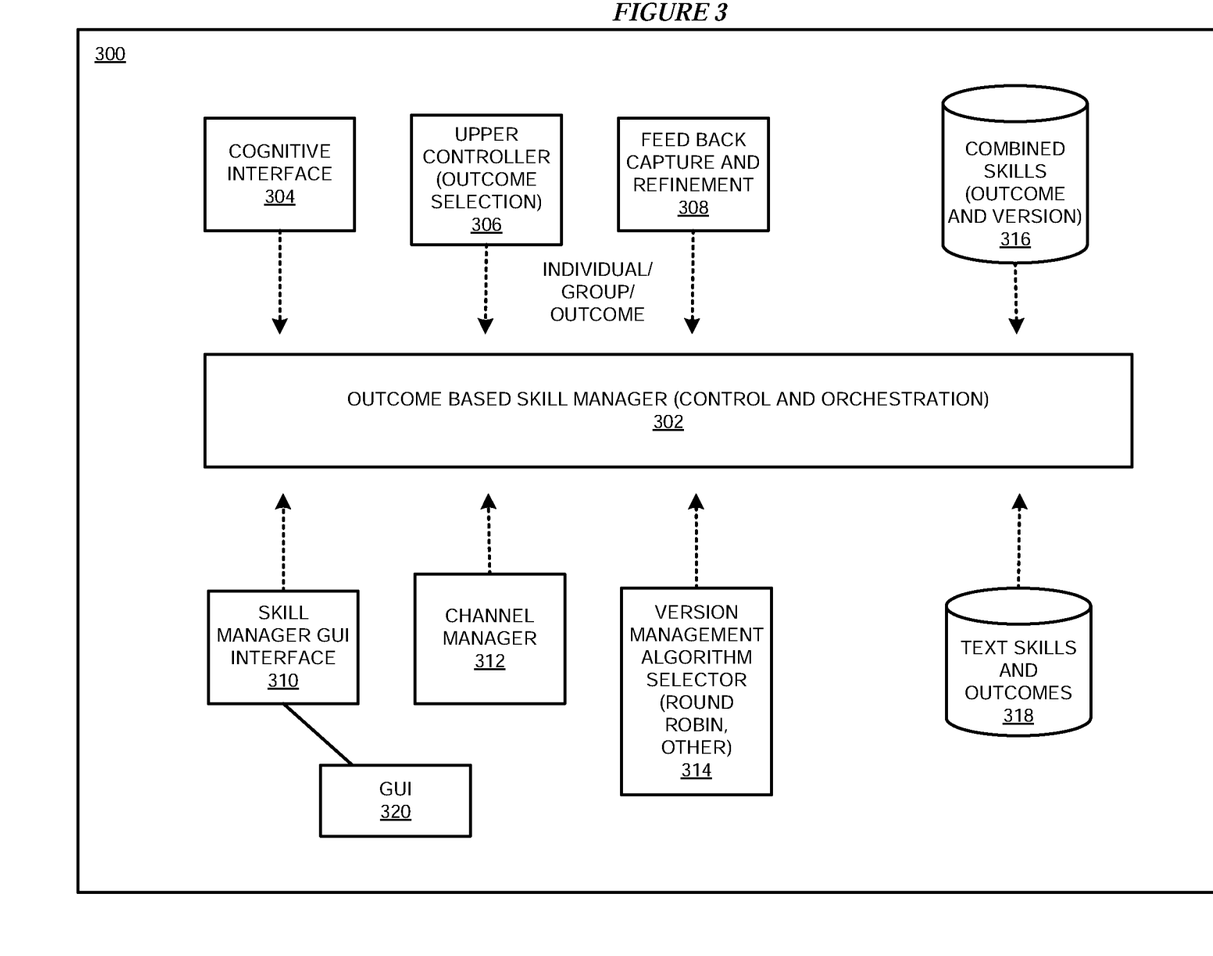
FIG. 3 depicts a block diagram of an example configuration for outcome-based skill qualification in cognitive interfaces for text-based and media-based interaction in accordance with an illustrative embodiment.

With reference to FIG. 3, this figure depicts a block diagram of an example configuration 300 for outcome-based skill qualification in cognitive interfaces for text-based and media-based interaction in accordance with an illustrative embodiment. The example embodiment includes an application 302. In a particular embodiment, application 302 is an example of application 105 of FIG. 1.

Applicant 302 is configured to perform outcome-based skill manager functions including control and orchestration of the selection of text skill versions during interactions between a cognitive interface 304 and a user as described herein. Application 302 interfaces with a cognitive interface 304, an upper controller 306, a feedback capture and refinement component 308, a skill manager GUI interface 310, a channel manager 312, a version management algorithm selector component 314, a combined skills database 316, and a text skills and outcomes database 318. In another embodiment, one or more of cognitive interface 304, upper controller 306, feedback capture and refinement component 308, skill manager GUI interface 310, channel manager 312, version management algorithm selector component 314, combined skills database 316, and text skills and outcomes database 318 may be integrated within application 302.

In one or more embodiments, cognitive interface 304 is configured to interact with a user using selected text versions to produce a desired outcome during the interaction. An upper controller 306 is configured to select a desired outcome of an interaction with the user such as producing a particular emotion from the user. Feedback capture and refinement component 308 is configured to capture feedback of reactions or outcomes associated with the selected text version from users and refine a probability of the outcome based upon the captured feedback. Skill manager GUI interface 310 allows a user of a GUI 320 to add new skills or modify existing skills of cognitive interface 304. Channel manager 312 is configured to manage one or more communication channels between a user and cognitive interface 304.

Version management algorithm selection component 314 is configured to select an algorithm used to choose a particular text skill version from among a number of available text skill versions. In particular embodiments, version management algorithm selection component 314 uses a round robin algorithm or other suitable algorithm to select a particular text skill version.

Combined skills database 316 stores outcomes and skill versions of combined skills for use during interactions with a user. Text skills and outcomes database 318 stores text skills (such as casual terms, terms related to local convention, similes, MMS messages) as well as individual, group, and regional context information. Text skills and outcomes database 318 further stores atomic and aggregated outcomes associated with particular skill versions.

Figure 4:
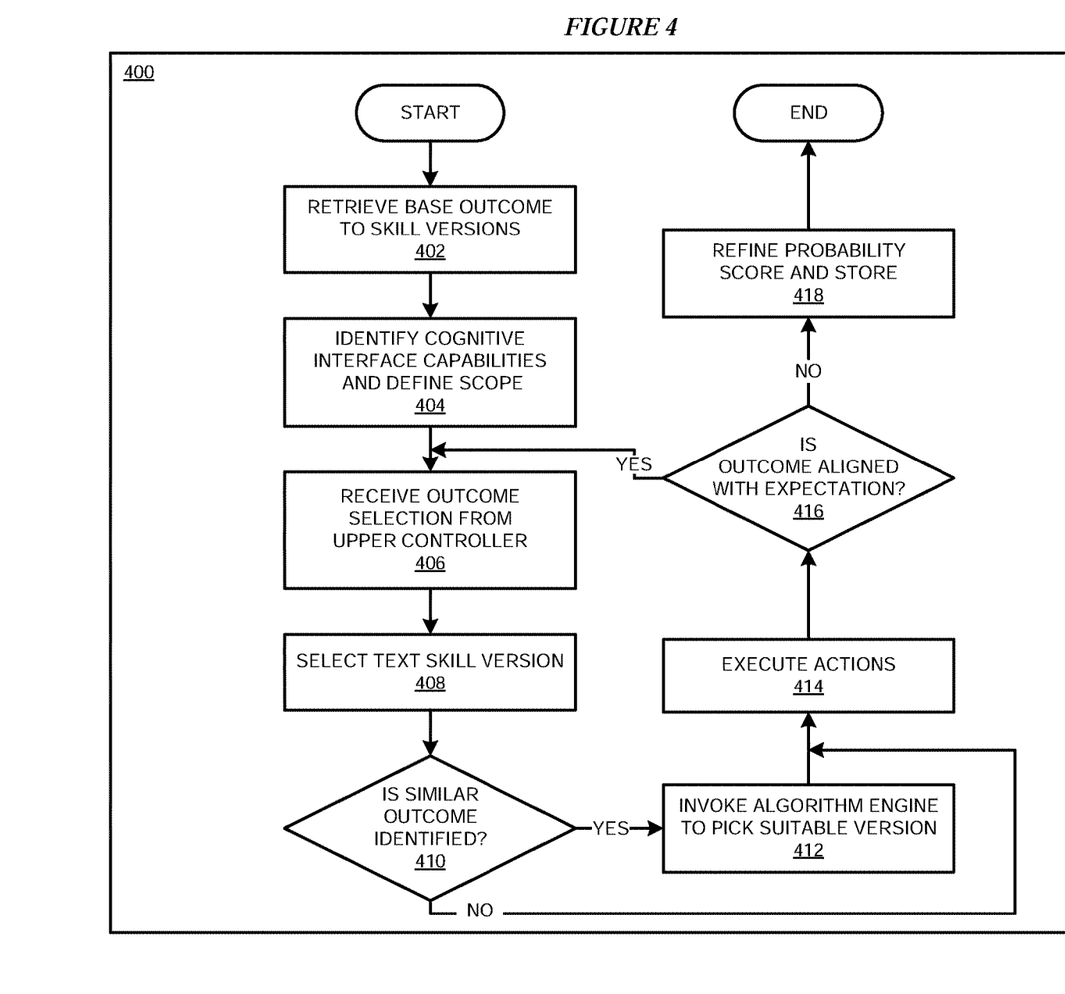
FIG. 4 depicts a flowchart of an example process for outcome-based skill qualification in cognitive interfaces for text-based and media-based interaction in accordance with an illustrative embodiment.

With reference to FIG. 4, this figure depicts a flowchart of an example process 400 for outcome-based skill qualification in cognitive interfaces for text-based and media-based interaction in accordance with an illustrative embodiment. In block 402, application 105 retrieves base outcomes and associated skill version information for a plurality skill versions. In particular embodiments, application 105 retrieves the outcomes and associated skill version information from a database. In block 404, application 105 identifies cognitive interface capabilities of one or more cognitive interfaces and defines a scope associated with each cognitive interface. In particular embodiments, a scope includes one or more of an identification of compatible user interfaces and/or compatible text skills associated with the cognitive interface.

In block 406, application 105 receives an outcome selection from an upper controller associated with the cognitive interface representing a desired outcome of an interaction between the cognitive interface and a user. In block 408, application 105 selects one or more particular text skill versions among a plurality of text skill versions to be used in the interaction to produce the desired outcome.

In block 410, application 105 identifies whether two or more of the selected text skill versions would produce a similar outcome within a threshold value of similarity. If two or more of the selected text skill versions would produce a similar outcome within the threshold value of similarity, process 400 continues to block 412. In block 412, application 105 invokes an algorithm engine to pick a suitable text skill version among the selected text skill versions and process 400 continues to block 414. In one or more embodiments, application 105 selects the text skill version having a greatest probability of resulting in the desired outcome among the possible text skill versions. If two or more of the selected text skill versions would not produce a similar outcome within the threshold value of similarity, process 400 continues to block 414.

In block 414, application 105 executes one or more actions including utilizing the selected text version in an interaction between the cognitive interface and the user. In block 416, application 105 determines whether an outcome of the interaction is aligned with an expectation of the desired outcome. In one or more embodiments, application 105 determines whether the outcome of the interaction is aligned with the expectation based upon receiving feedback indicating a reaction of the user to the outcome. If the outcome is aligned with the expectation, process 400 returns to block 406. If the outcome is not aligned with the expectation, process 400 continues to block 418.

In block 418, application 105 refines (e.g., decreases) a probability score for the selected text version producing the associated outcome. In still other embodiments, application 105 may associate a different outcome with the selected text version. Process 400 then ends.

Figure 5:
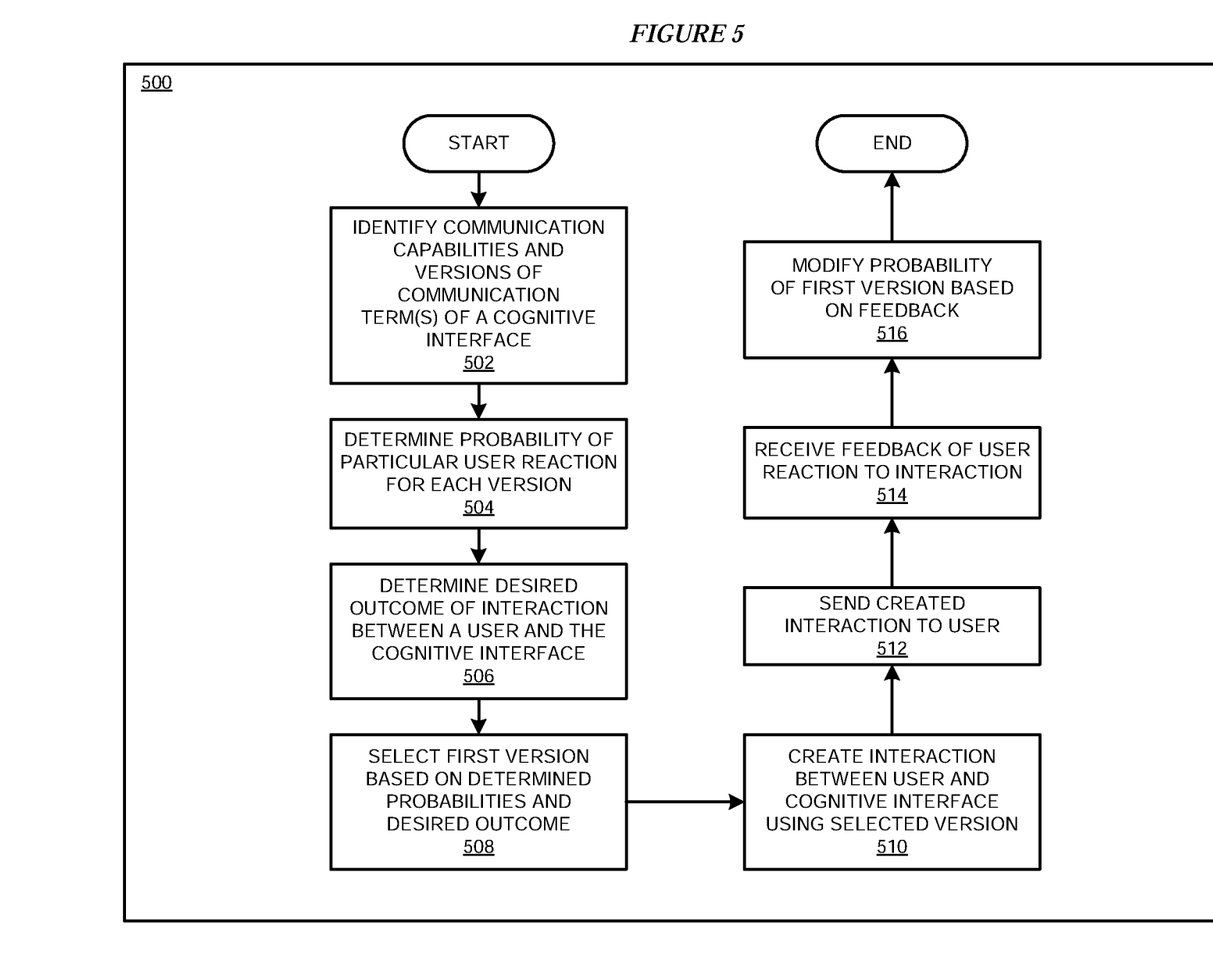
FIG. 5 depicts a flowchart of another example process for outcome-based skill qualification in cognitive interfaces for text-based and media-based interaction in accordance with an illustrative embodiment.

With reference to FIG. 5, this figure depicts a flowchart of another example process 500 for outcome-based skill qualification in cognitive interfaces for text-based and media-based interaction in accordance with an illustrative embodiment. In block 502, application 105 identifies communication capabilities and a plurality of versions of communication terms of a cognitive interface. In one or more embodiments, the communication term versions include text skill including one or more text terms or other text features to be utilized during an interaction with a user to produce a desired outcome of the interaction. In other embodiments, the communication term versions may include audio, video, and/or images to be used during an interaction to produce a desired outcome of the interaction. In block 504, application 105 determines a probability of a particular user reaction for each communication term version. In block 506, application 105 determines a desired outcome of an interaction between a user and the cognitive interface. For example, a desired outcome may include changing an emotional level of the user such as increasing the happiness of the user during the interaction.

In block 508, application 105 selects a first communication term version from the plurality of communication term versions based on the determined probabilities of the communication term versions and the desired outcome. In block 510, application 105 creates an interaction between the user and the cognitive interface using the selected first communication term version. In one or more embodiments, the communication terms may include other associated media such as audio and/or video media represented in parallel or sequentially with text communication terms during an interaction for achieving one or more desired outcomes. In block 512, application 105 sends the created interaction to the user.

In one or more embodiments, the user receives the interaction using a user interface of a communication device.

In block 514, application 105 receives feedback of a reaction of the user to the interaction. In particular embodiments, the feedback may include audio, video, or other sensor feedback indicative of a reaction of the user to the text version such as, for example, facial reactions, gestures, or voice inflection. In other particular embodiments, the feedback may include input from an emotion analytics component to provide an analysis of an emotion change of the user in response to the first communication term version. In block 516, application 105 modifies the probability of the first communication term version based on the feedback. In a particular embodiment, application 105 decreases the probability of the first communication term version producing the associated outcome. In still other embodiments, application 105 may associate a different outcome with the first communication term version. Process 500 then ends.

Thus, a computer implemented method, system or apparatus, and computer program product are provided in the illustrative embodiments for outcome-based skill qualification in cognitive interfaces for text-based and media-based interaction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
identifying one or more communication capabilities and first and second communication term versions of a first cognitive interface, wherein the first and second communication term versions each comprise one or more specified features usable during an interaction using the first cognitive interface;
identifying one or more communication capabilities of a second cognitive interface;
determining a first probability of a particular user emotional reaction for the first communication term version, and a second probability of the particular user emotional reaction for the second communication term version;
determining a desired emotional outcome of an interaction between a user and the first cognitive interface;
selecting the first communication term version from among a plurality of communication term versions, wherein the plurality of communication term versions comprises the first and second communication term versions, wherein the first communication term version is selected based on the determined first and second probabilities of the communication term versions and the desired emotional outcome;
creating an interaction between the user and the first cognitive interface and the second cognitive interface using the selected first communication term version, wherein the creating includes setting text and video to be presented in parallel by the first and second cognitive interfaces in accordance with the respective communication capabilities of the first and second cognitive interfaces; and
sending the interaction to a communication device associated with the user.

2. The computer-implemented method of claim 1, further comprising:
receiving feedback of a reaction of the user to the interaction; and
modifying the probability of the first communication term version based on the received feedback.

3. The computer-implemented method of claim 2, wherein the feedback includes at least one of audio or video feedback indicative of a reaction of the user to the interaction.

4. The computer-implemented method of claim 2, wherein the feedback includes at least one of a facial reaction, a gesture, or a voice inflection of the user.

5. The computer-implemented method of claim 2, wherein the feedback includes an emotion change of the user in response to the interaction.

6. The computer-implemented method of claim 1, further comprising:
receiving feedback of a reaction of the user to the interaction; and
changing an outcome associated with the first communication term version based on the received feedback.

7. The computer-implemented method of claim 1, wherein the first communication term version comprises at least one text term or text feature.

8. The computer-implemented method of claim 7, wherein the text feature comprises one or more of text acronyms, similes, symbols, or images.

9. The computer-implemented method of claim 1, wherein the first communication term version comprises at least one of audio media or video media.

10. A computer usable program product comprising one or more computer-readable storage devices, and program instructions stored on at least one of the one or more storage devices, the stored program instructions comprising:
program instructions to identify one or more communication capabilities and first and second communication term versions of a first cognitive interface, wherein the first and second communication term versions each comprise one or more specified features usable during an interaction using the first cognitive interface;
program instructions to identify one or more communication capabilities of a second cognitive interface;
program instructions to determine a first probability of a particular user emotional reaction for the first communication term version and a second probability of the particular user emotional reaction for the second communication term version;
program instructions to determine a desired emotional outcome of an interaction between a user and the first cognitive interface;
program instructions to select the first communication term version from among a plurality of communication term versions, wherein the plurality of communication term versions comprises the first and second communication term versions, wherein the first communication term version is selected based on the determined first and second probabilities of the communication term versions and the desired emotional outcome;

program instructions to create an interaction between the user and the first cognitive interface and the second cognitive interface using the selected first communication term version wherein the creating includes setting text and video to be presented in parallel by the first and second cognitive interfaces in accordance with the respective communication capabilities of the first and second cognitive interfaces; and program instructions to send the interaction to a communication device associated with the user.

11. The computer usable program product of claim 10, further comprising:

program instructions to receiving feedback of a reaction of the user to the interaction; and program instructions to modify the probability of the first communication term version based on the received feedback.

12. The computer usable program product of claim 11, wherein the feedback includes include at least one of audio or video feedback indicative of a reaction of the user to the interaction.

13. The computer usable program product of claim 11, wherein the feedback includes at least one of a facial reaction, a gesture, or a voice inflection of the user.

14. The computer usable program product of claim 11, wherein the feedback includes an emotion change of the user in response to the interaction.

15. The computer usable program product of claim 10, further comprising:

program instructions to receive feedback of a reaction of the user to the interaction; and program instruction to change an outcome associated with the first communication term version based on the received feedback.

16. The computer usable program product of claim 10, wherein the computer usable code is stored in a computer readable storage device in a data processing system, and wherein the computer usable code is transferred over a network from a remote data processing system.

17. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to identify one or more communication capabilities and first and second communication term versions of a first cognitive interface, wherein the first and second communication term versions each comprise one or more specified features usable during an interaction using the first cognitive interface;

program instructions to identify one or more communication capabilities of a second cognitive interface;

program instructions to determine a first probability of a particular user emotional reaction for the first communication term version and a second probability of the particular user emotional reaction for the second communication term version;

program instructions to determine a desired emotional outcome of an interaction between a user and the first cognitive interface;

program instructions to select the first communication term version from among a plurality of communication term versions, wherein the plurality of communication term versions comprises the first and second communication term versions, wherein the first communication term version is selected based on the determined first and second probabilities of the communication term versions and the desired emotional outcome;

program instructions to create an interaction between the user and the first cognitive interface and the second cognitive interface using the selected first communication term version wherein the creating includes setting text and video to be presented in parallel by the first and second cognitive interfaces in accordance with the respective communication capabilities of the first and second cognitive interfaces; and program instructions to send the interaction to a communication device associated with the user.

19. The computer system of claim 18, the stored program instructions further comprising:

program instructions to receiving feedback of a reaction of the user to the interaction; and program instructions to modify the probability of the first communication term version based on the received feedback.

* * * * *